E. T. SILVIUS.
TRANSMISSION AND CONTROLLING GEARING.
APPLICATION FILED AUG. 30, 1916.
1,341,442.
Patented May 25, 1920.
2 SHEETS—SHEET 1.
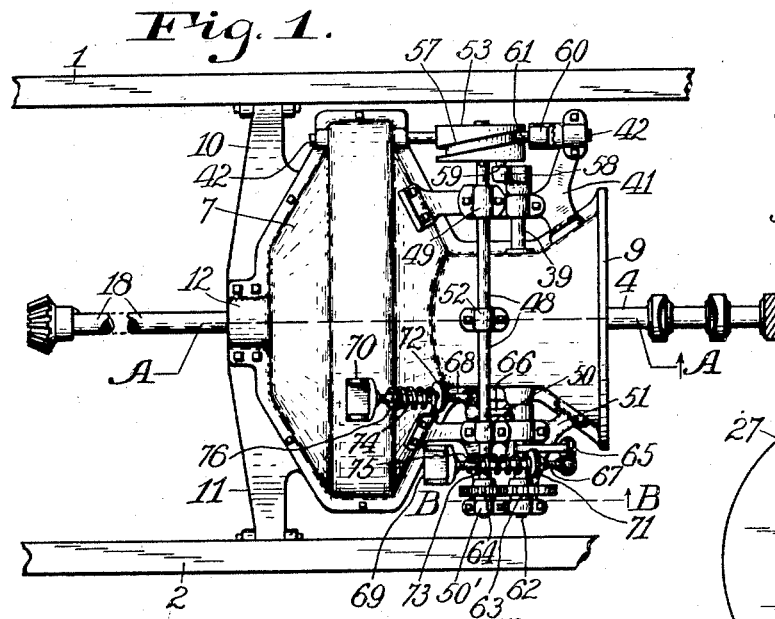
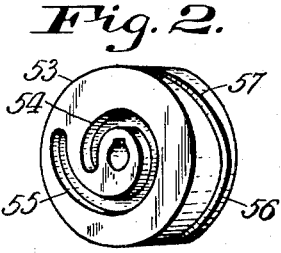
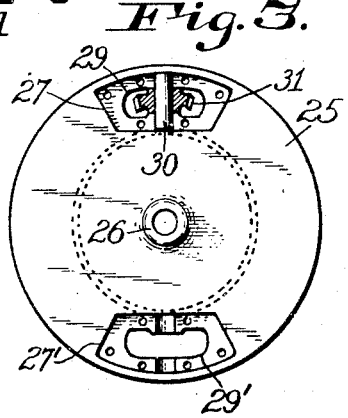
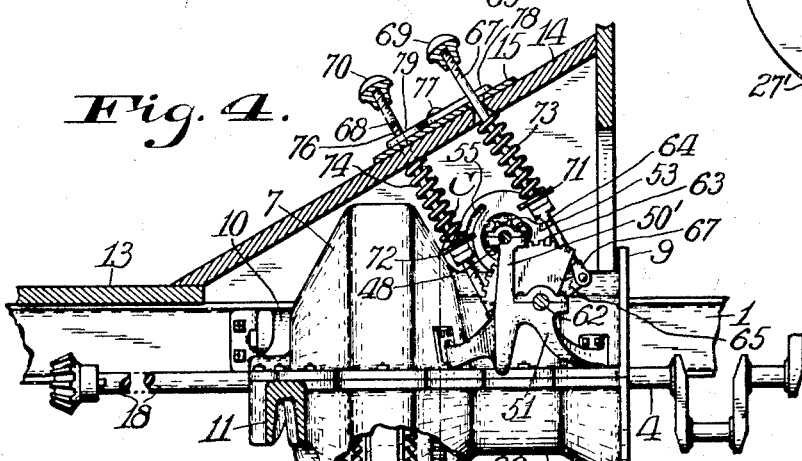
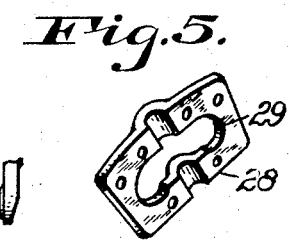
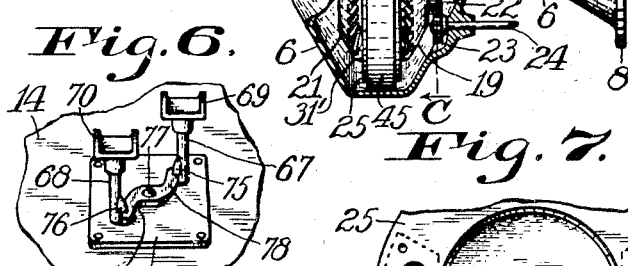
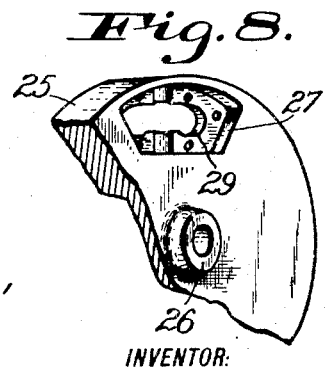
WITNESSES:
J. H. Gardner
Myrtle McCoy
INVENTOR:
Ellis T. Silvius E. T. SILVIUS.
TRANSMISSION AND CONTROLLING GEARING.
APPLICATION FILED AUG. 30, 1916.
1,341,442. Patented May 25, 1920.
2 SHEETS—SHEET 2.
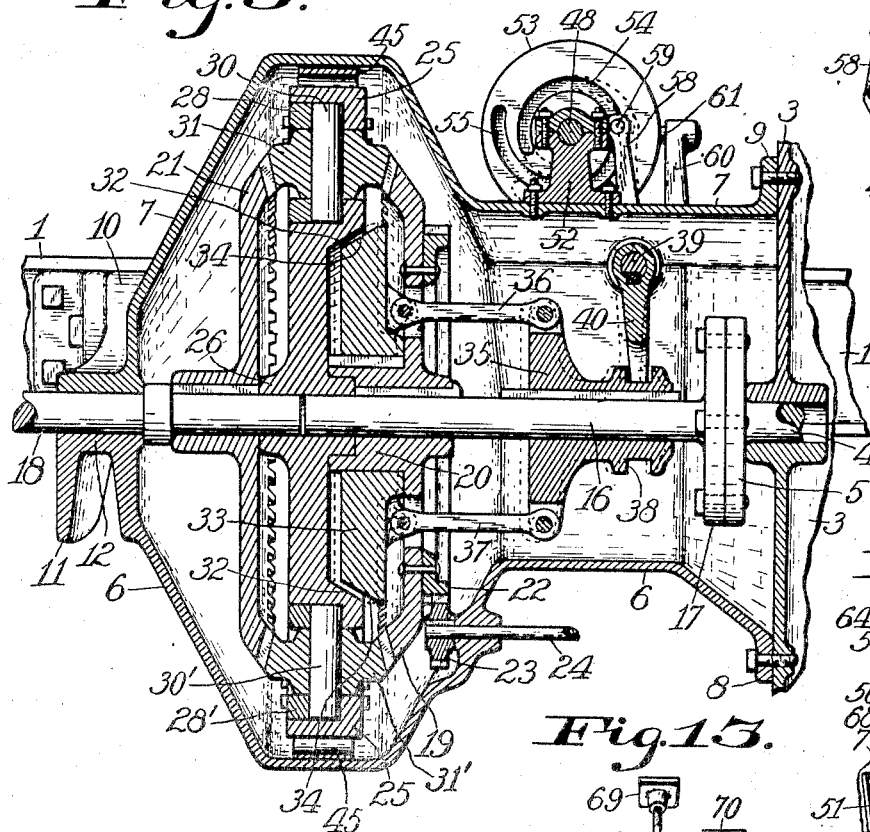
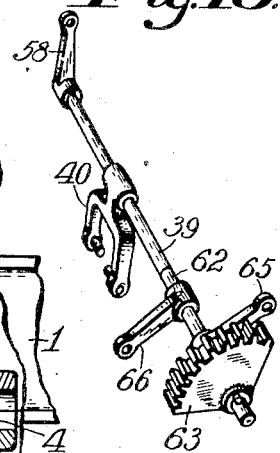
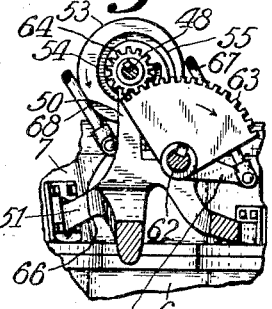
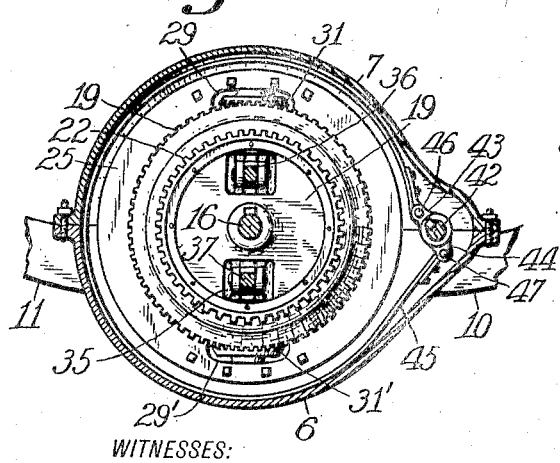
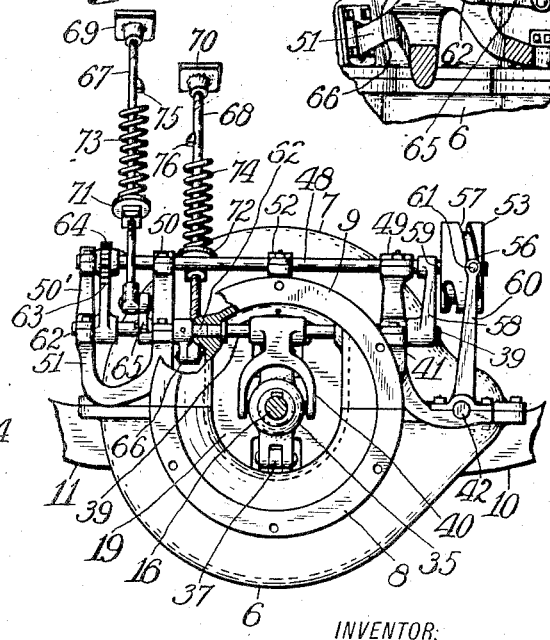
WITNESSES:
J. H. Gardner.
Myrtle McCoy.
INVENTOR:
Ellis T. Silvius.

UNITED STATES PATENT OFFICE.

ELLIS T. SILVIUS, OF INDIANAPOLIS, INDIANA.

TRANSMISSION AND CONTROLLING GEARING.

1,341,442.  Specification of Letters Patent.  Patented May 25, 1920.

Application filed August 30, 1916. Serial No. 117,804.

*To all whom it may concern:*

Be it known that I, ELLIS T. SILVIUS, a citizen of the United States, residing at Indianapolis, in the county of Marion and State of Indiana, have invented a new and useful Improvement in Transmission and Controlling Gearing, of which the following is a specification, reference being had to the accompanying drawings and to the letters and figures of reference marked thereon.

This invention relates to speed-changing transmission gearing or mechanism of the type that is capable of reversibly transmitting rotary power motion from a driving shaft to a driven shaft, and more particularly from the crank shaft of an explosion engine to the driven propeller shaft comprised in an automobile, motor truck, or motor boat, the invention relating also to controlling gearing or mechanism for the transmission gearing or mechanism. The invention relates also further to improvements in and modifications of the transmission and controlling gearing described in my prior application for Letters Patent filed February 14, 1916, Serial Number 78,251, the present application for Letters Patent being a continuation of said prior application in so far as the subject-matter is common to both applications.

An object of the invention is to provide a gradual-change variable speed transmission gearing that shall be simply constructed and be capable of reversing the direction of the motion transmitted, and in a noiseless and smoothly-operating manner, which gearing shall be so constructed as to permit it to be simply and readily operated and controlled for controlling the movements of the automobile or other vehicle that may be equipped with the gearing.

Another object is to provide an improved controlling gearing or mechanism for the above-mentioned type of transmission gearing, which shall be so constructed as to permit of simple operation by foot-power to control the movements of the vehicle through the operation of the transmission gearing, which controlling gearing shall include a single primary controller for both forward and reverse motions of the transmission gearing or mechanism.

Another object is to provide an improved controlling gearing or mechanism, for operating and controlling the adjustable elements of a speed-changing and reversing transmission gearing of the type that is designed to disconnect the propeller shaft from the engine of an automobile, which controlling gearing or mechanism shall be so constructed as to require manual control to maintain connection of the propeller shaft with the engine, and be capable of automatically operating, following release from manual control, to cause the propeller shaft to be disconnected from the engine, to the end that, in case of accident while on the road, to the automobile or the operator of such nature as to prevent the operator from continuing manual control, automatic action shall occur to prevent the engine from further driving the automobile or its driving wheels, and thus avoid causing further accidental injury or damage that might result from continued propulsion.

A further object is to provide speed-changing transmission gearing and controlling gearing of such construction as to be capable of being constantly controlled manually to gradually vary the speed of the automobile or vehicle under varying conditions as when the automobile is passing over a hilly road, and to cause the propeller shaft to be quickly disconnected from the engine or to be connected with the engine in crowded streets when prompt action of the operator may be necessary.

A still further object is to provide improved means for connecting and controlling two series of reversing devices involved in reversing speed-changing transmission gearing, so that the two series may be operated and controlled by a single primary controller; and, also, an object is to provide improved foot-pedal construction whereby to operate and control a primary controller for two series of reversing devices; other objects being to simplify various features of transmission and controlling gearing or mechanism and reduce the number of elements thereof to the minimum within the range of practicability.

The invention consists, in view of the above-mentioned and other objects, in means of improved construction whereby to simply and reliably control the movements of an automobile or similar vehicle by the application of foot-power; the invention consisting further in certain novel features of construction in speed changing transmission gearing and also in controlling means for the gearing, and in the novel parts and combinations of parts, as hereinafter particularly described and further defined in the accompanying claims.

Referring to the drawings on which like characters of reference indicate like parts or features of construction—

Figure 1 is a top plan of the improved gearing and the casing of portions thereof.

Fig. 2 is a perspective view of an improved form of a synchronical controller device for linking together and controlling two series of controller devices comprised in the gearing.

Fig. 3 is an elevation of the main part of a rotatable gear frame comprised in the gearing.

Fig. 4 is a side elevation of the gearing partially broken away and shown in relation to portions of an automobile body.

Fig. 5 is a perspective view of one of the parts of the rotatable gear frame.

Fig. 6 is a perspective view of the foot pedals with which the primary controller of the gearing preferably is provided.

Fig. 7 is an elevation of the gear frame partially broken away.

Fig. 8 is a perspective view of the main part of the gear frame partially broken away.

Fig. 9 is a longitudinal section of the gearing approximately on the line A A on Fig. 1.

Fig. 10 is a perspective view of two alining shafts and appliances thereon which comprise parts of the controlling gearing.

Fig. 11 is a fragmentary sectional elevation approximately on the line B B on Fig. 1.

Fig. 12 is a sectional elevation approximately on the line C C on Fig. 4, and

Fig. 13 is a front elevation of the gearing partially broken away.

In one form of construction and arrangement the gearing is adapted for use in automobile construction and is so shown for the purpose of illustration and description of the invention, an automobile of familiar type having a frame comprising side rails 1 and 2. It will be understood also that the automobile includes an explosion engine having a crank case 3 and a crank shaft 4, the shaft being provided outside the case with a coupling flange 5.

The invention includes a gear case or housing which preferably comprises a lower part 6 and an upper part 7 bolted together and provided respectively with flange members 8 and 9 which are bolted to the crank case 3. The gear case is provided also with supporting arms 10 and 11 that are secured to the side rails 1 and 2 respectively. The rear end of the gear case is provided with a suitable journal box 12. The automobile body commonly has a floor 13 which has an inclined portion 14, and for the purpose of the present invention the top of the portion 14 preferably is provided with a fixed guide plate 15.

A practical embodiment of the invention comprises a driving shaft 16 which is provided with a coupling flange 17 that is bolted to the flange 5, the shaft 16 thus comprising a practical continuation of the crank shaft 4 in the gear casing. A driven shaft or propeller shaft 18 is suitably supported and has support in the journal box 12 so that it is in alinement with the driving shaft 16. A bevel toothed driving wheel 19 is secured to the shaft 16 by means of its hub 20 which preferably is elongated rearwardly. A bevel toothed driven wheel 21 is spaced apart from the driving wheel and secured to the driven shaft 18. The driving wheel 19 is provided on its outside with a gear wheel 22 to be driven by a pinion 23 in engagement therewith, the pinion being mounted on a shaft 24 which is suitably arranged in and extends through the gear case, so that the explosion engine may be started by means of a suitable power starter now commonly employed for the purpose.

A gear controllable frame is arranged between the driving wheel and the driven wheel and comprises a main part 25 having a hub 26 that is rotatably supported on the adjacent portions of the shafts 16 and 18. The gear frame has recesses 27 and 27' in which journal box caps 28 and 28' are respectively secured, and the main part of the frame and the caps have apertures 29 and 29' therein to receive pinions. Axles 30 and 30' are arranged in the recesses and retained by the box caps and rotatably support pinions 31 and 31' respectively, each pinion being constantly in mesh with the driving wheel and the driven wheel, the axles being arranged radially with respect to the driving shaft. The gear frame has a smooth peripheral face adapted to be frictionally engaged to control the rotation of the frame. The forward side of the gear frame that is adjacent to the driving wheel has an annular friction-contact face 32 that preferably is inclined so as to present an approximately concave face toward the driving shaft. A driving and controlling device is provided for the gear frame and preferably is formed as a disk 33 having a beveled periphery 34 that is smooth and conforms to the contact-face 32 of the gear frame, the disk being arranged so as to be rotated by means of the driving shaft 16, the disk preferably being adjustably fitted on the hub 20 of the driving wheel and splined thereto so as to be adjustable to the gear frame. The disk is directly adjustable and controlled by means of a sleeve 35 that is movable on the shaft 16, and coupling rods 36 and 37 connected to the sleeve and to the disk, the coupling rods extending through the driving wheel 19 which has suitable openings therein. The sleeve 35 has a circumferential groove 38 therein for its control. A shaft 39 is suitably journaled in the gear case and has a shifter arm 40 secured thereto, the shifter arm being forked so as to extend into the groove 38. The gear case is preferably provided with an external supporting frame 41 that partially supports the shaft 39. When the sleeve 35 is moved rearward the disk 33 is moved into contact with the gear frame to rotate the frame at variable speed or at the maximum speed of the driving wheel as may be desired, the gear frame being practically clamped or locked to the driving shaft or driving wheel when sufficient force is applied to the disk. When graduated force is applied the disk exerts sliding frictional driving force on the gear frame to rotate it at variable speed depending upon the degree of pressure exerted thereon, so that the pinions 31 and 31' are more or less retarded in their rotation and therefore vary the speed of the driven wheel 21. When the gear frame is locked substantially to the driving shaft and the driving wheel the pinions act as lugs to turn the driven wheel at the same speed as the driving wheel and in the same direction, being designed for propelling the vehicle forward. When so operating at engine speed no wear of the gear teeth occurs. The direction of the movement of the driven shaft is reversible by suitable means comprising preferably a shaft 42 rotatively supported in the gear case and partially by the frame 41, a lever secured between its ends to the shaft within the casing so as to have two arms 43 and 44 to which the ends of a band 45 are connected by means of pivots 46 and 47 respectively, the band extending about the gear frame and being adapted to have sliding frictional contact with the periphery of the frame when the band is drawn thereto on rotary movement of the shaft. When the band is drawn into contact with the gear frame the latter may be gradually retarded in its rotary movement or may be stationarily clamped or locked substantially to the gear case, depending upon the degree of force applied to the band. A main controller shaft 48 is arranged upon the gear case and rotatively supported in a standard portion 49 of the frame 41 and also the standard portions 50 and 50' of a frame 51 which is secured to the exterior of the gear case, the shaft preferably being provided also with a supporting box 52 secured centrally upon the gear case. A cylindrical synchronical controller or shifting-link 53 is fixedly secured to the shaft 48 and has a cam groove in one end thereof which has a portion 54 that extends concentrically to the shaft and a continuing portion 55 that is eccentric to the shaft or axis of rotation of the controller. The cylindrical periphery of the controller has also a cam groove therein which has a portion 56 that extends circumferentially on a plane at right angles to the axis of rotation of the controller and a continuing portion 57 that extends spirally relatively to the axis of rotation. An arm 58 is fixed on the shaft 39 and has a wrist pin 59 that extends into the groove formed in the end of the controller. An arm 60 is secured to the shaft 42 and has a wrist pin 61 that extends into the peripheral groove of the controller, so that the controlling apparatus for the forward motion and the reverse motion controls are linked or coupled together to be noiselessly operated and synchronously controlled by a single primary controller which may be variously constructed in detail.

Preferably the primary controller includes a shaft 62 that is arranged in alinement with the shaft 39 and rotatively supported by the frame 51 and partially by the gear case, a gear segment 63 being secured to the shaft and in engagement with a pinion 64 that is secured to the shaft 48, the arrangement being such as to enable the shaft 62 to turn the shaft 48 at relatively increased speed. The shaft 62 is provided with an operating and controlling arm, and in order that the shaft may be actuated and controlled by foot power the shaft preferably has two arms 65 and 66 on opposite sides thereof so that the shaft may be turned by pressing downward on either one of the arms. The arms preferably are provided respectively with push bars 67 and 68 that extend therefrom through the inclined portion 14 of the floor of the automobile body and through the guide plate 15, and are provided on their tops with foot pieces 69 and 70 respectively so as to constitute foot pedals or levers. Preferably the shaft 62 is normally held in balance by means of spring seats 71 and 72 on the push rods 67 and 68 respectively, the spring seats preferably being adjustable on the push rods, and springs 73 and 74 seated on the spring seats respectively and against the under side of the floor portion 14, the two springs having the same degree of tension. The action of the springs automatically maintains the primary controller in mid-position when the pedals are not manually controlled, so as to enable the controller to automatically disconnect the propreller shaft from the driving shaft. It should be understood, however, that either one or both of the springs could be omitted if desired. Preferably the push bars are provided respectively with stop projections 75 and 76 to lock them and prevent accidental operation thereof, in which case the guide plate 15 is provided with a pivot 77, and a latch bar is connected between its ends thereto so as to provide two latch members 78 and 79 that can be brought into simultaneous engagement with the projections and prevent downward movement of the push rods, the latch bar being conveniently arranged to be moved by the foot of the operator.

It should be understood that portions of the controlling gearing are shown in the interest of clearness on the exterior of the gear case but are not necessarily uncovered in practice, and it should be understood that the gear case may be variously modified and that it be constructed so as to contain lubricating oil for the machinery therein.

In practical use, the gearing being considered as applied to an automobile and assumming that the primary controller is in mid-position and that the engine or motor is in motion, the crank shaft 4 turning constantly in one direction, the disk 33 and the driving wheel 19 rotate together, the latter rotating the pinions 31 which practically roll on the driven wheel 21 which is assumed to be at rest, and therefore the gear frame is rotated at a lower speed than that of the driving wheel. To start the vehicle the operator pushes downward on the forward pedal 69 which turns the shaft 62, the latter causing the shaft 48 to be turned so that the controller 53 is turned. In mid-position of the controller the wrist pin 59 is in the groove portion 54, the wrist pin 61 being in the groove portion 56. On rotation of the controller the wrist pin 59 follows the groove into the portion 55 while the wrist pin 61 remains in the portion 56 of its guide groove, the result being that the arm 58 is moved so as to cause the arm 40 to move the sleeve 35 in operative direction which forces the disk 33 into contact with the gear frame. When the frictional contact between the disk and the gear frame is sufficient to overcome the resistance of the automobile on the ground the gear frame is slowly put in motion by the disk and driven thereby, so that the frame rotates faster than before and consequently causes the pinions to rotate at relatively less speed than before, with the result that the pinions slowly rotate the driven wheel 21. If it be desired to increase the speed of the automobile the pressure on the pedal is increased with the result that the speed of the driven wheel is gradually increased. When the maximum speed is desired, further pressure on the pedal is applied until the gear frame is caused to rotate at the same speed as the driving wheel, so that the latter cannot rotate the pinions 31 which therefore turn the wheel 21 at the same speed as the driving wheel 19. When it is desired to stop the automobile the foot is removed from the pedal 69 and may be placed on the pedal 70 to bring the pedals to mid-position, or the latter is accomplished by means of the springs if provided. The springs may prove a safe-guard in case of accident or in case the operator is incapable of operating the pedals, since the springs act to automatically prevent the engine from driving the automobile and permits the latter to stop moving. When it is desired to drive the automobile backward the operator places his foot upon the rearward pedal 70 and presses it downward, and this may be done either when the automobile is at rest or while it is still moving forward, the result being that the controller 53 is caused to be turned, and while the wrist pin 59 remains in the groove portion 54 the wrist pin 61 follows its groove into the cam portion 57 so as to cause rotary movement of the shaft 42 which tightens the band 45 on the gear frame. If now the automobile is at rest and assuming that the engine is turning the driving wheel 19 in its normal direction so as to cause rotation of the pinion 31, it will be apparent that the band 45 will retard the rotary movement of the gear frame and enable the rotating pinions to turn the driven wheel 21 backward so as to cause backward movement of the automobile. Varying the pressure on the pedal modifies the speed in reverse motion, and when sufficient pressure is applied to stop rotation of the gear frame, it is evident that the driven wheel 21 is rotated at a speed corresponding to that of the driving wheel 19.

Having thus described the invention, what is claimed as new is:

1. Transmission and controlling gearing including reversing motion-transmission gearing, two series of movable means for controlling the motion-transmission gearing, a position-holding primary controller movably supported and having graduating operating and controlling connections with the two series of movable means to control the direction of motion transmitted, and an operating device adapted to move and set the primary controller to position and provided with a foot-receiving top.

2. Transmission gearing including a rotatable driving wheel, a driven wheel, a gear frame having a hub rotatably supported between the driving wheel and the driven wheel, the gear frame having a friction-contact face presented toward the driving wheel, a pinion rotatable in the gear frame in engagement with the driving wheel and the driven wheel, a friction-contact driving device splined on the driving wheel to rotate therewith and adapted to coöperate with the friction-contact face of the gear frame, and controlling means mounted to rotate with the driving wheel and having an element extending through the driving wheel and connected with the driving device.

3. Transmission and controlling gearing including reversing speed-changing gearing, an operative primary controller provided with two foot pedals, and two series of movable means for controlling the speed-changing gearing and direction of motion transmitted, the two series of movable means being operatively connected with the primary controller to be controlled thereby.

4. Transmission and controlling gearing including reversing speed-changing gearing, an operative primary controller provided with two foot-pedals for alternatively operating the controller, each foot-pedal having a retracting-spring, and two series of movable means operatively connected with the primary controller and adapted for controlling the speed-changing gearing and direction of motion transmitted.

5. A transmission gearing including a driving shaft, a driving wheel to be rotated by the shaft, a driven wheel, a rotatable frame having a conoidal friction-contact face, a pinion rotatable in the frame in engagement with the driving wheel and the driven wheel, a conoidal friction-drive device to be rotated by the driving shaft and axially adjustable thereto and to the friction-contact face for gradually starting and varying the rate of rotation of the frame.

6. A transmission gearing including a rotatable driving wheel having two series of gear teeth thereon, a driven wheel, a rotatable frame, a pinion rotatable in the frame in engagement with the driven wheel and a tooth of one of the series of gear teeth, a rotatable starting pinion to engage the teeth of the remaining series of gear teeth, and a driving device to be driven by the driving wheel and adjustable to the rotatable frame to variably rotate the frame relatively to the driving wheel.

7. A transmission gearing including a rotatable bevel-toothed driving wheel, a friction-contact disk rotatable with the wheel, the disk being axially adjustable on the wheel, a rotatable bevel-toothed driven wheel, a gear frame rotatably guided between the driving wheel and the driven wheel and adapted to be engaged and rotated by the friction-contact disk, a bevel-toothed pinion rotatably mounted in the gear frame and meshing with the driving wheel and the driven wheel, and adjusting means extending through the driving wheel and connected with the friction-contact disk.

8. Transmission and controlling gearing including a driving wheel to rotate in forward direction, a rotatable driven wheel, speed-changing and reversing gearing having a movable element in continued engagement with the driving wheel and the driven wheel, a series of controlling means for the gearing enabling the driving wheel to rotate the gearing and thereby the driven wheel at variable speed in the forward direction, a series of controlling means for the gearing enabling the driving wheel to rotate the driven wheel at variable speed in the reverse direction, and a movably supported manually operated and automatically-retracted prime controller provided with a movable graduating device having sliding controlling connection with the two series of controlling means.

9. In reversing transmission and controlling gearing, the combination with reversing motion-transmission gearing, and two series of connecting means adapted for controlling the gearing and direction of motion transmitted, each series of said means including a movable arm operating at right-angles to the arm of the other series of means, of a synchronical controller movably supported and controlled and having two relatively right-angled operative sides, one of said operative sides having controlling connection with one of said arms, the other of said sides having controlling connection with the other of said arms.

10. In reversing transmission and controlling gearing, the combination of a crank shaft, a propeller shaft, reversing drive gearing for connecting the propeller shaft with the crank shaft, a prime controller for the drive gearing and movable to and fro, the controller being provided with two foot-levers for moving the controller to and fro respectively and alternately, and locking means for preventing actuation of the foot-levers.

11. In reversing transmission and controlling gearing, the combination of a crank shaft, a propeller shaft, reversing drive gearing for connecting the propeller shaft with the crank shaft, a prime controller for the drive gearing and movable to and fro, the controller having a mid-position in which to disconnect the drive gearing operatively from the propeller shaft, and means for yieldingly holding the prime controller in its mid-position.

12. In reversing speed-changing transmission gearing, the combination of a crank shaft, a propeller shaft, reversing variable-speed gearing including a driving gear wheel secured to the crank shaft for connecting the propeller shaft with the crank shaft, the driving gear wheel having a starting-gear thereon, means for controlling the variable-speed gearing, a pinion to engage the starting-gear, and means for rotating the pinion.

13. In transmission and controlling gearing, the combination with reversible speed-changing transmission gearing, and two series of movable means for controlling the speed-changing gearing and direction of motion transmitted, of a main controller shaft rotatively supported and provided with a synchronical controller having sliding connection with a member of each of the two series of movable means, and two alternately operable foot-pedals for controlling the controller shaft.

14. In reversing transmission gearing, the combination of a lubricant-holding anchored casing, a driving shaft rotatable in the casing, a driving wheel secured to the driving shaft, a gear frame rotatable in the casing and having a contact face presented toward the driving wheel, a pinion rotatable in the gear frame in engagement with the driving wheel, a rotatable driven wheel in engagement with the pinion, driving means for engagement with the contact face of the gear frame to secure the frame substantially to the driving shaft, the driving means being arranged between the driving wheel and the frame, and means for securing the gear frame substantially to the casing.

15. In reversing transmission gearing, the combination of reversing motion-transmission gearing having adjustable friction-contact controlling devices, and two series of connecting and controlling means to adjust the controlling devices for controlling the direction of motion transmitted, each series of connecting and controlling means having a movable arm operating at right-angles to the arm of the other series of means, with a synchronical controller movably supported and controlled and having controlling connection at two relatively right-angled sides thereof with said arms respectively.

16. In transmission and controlling gearing, the combination with reversible speed-changing transmission gearing, and two series of movable means for controlling the speed-changing gearing and direction of motion transmitted, of a main controller shaft rotatively supported and provided with a synchronical controller connected with a member of each of the two series of movable means, a pinion secured to the controller shaft, a primary controller shaft rotatively supported and having two arms thereon for controlling the shaft, and a gear segment secured to the primary controller shaft and engaging said pinion.

17. In reversing speed-changing transmission gearing, the combination of a crank shaft having a driving wheel and also a conoidal friction-drive device thereon to be rotated thereby, said device being axially adjustable relatively to the shaft, a gear frame rotatably supported adjacent to the friction-drive device and having a conoidal contact face adapted to be engaged by the conoidal device, a propeller shaft rotatable in alinement with the driving shaft, a driven gear wheel secured to the propeller shaft, a pinion rotatable in the gear frame in engagement with the driving wheel and the driven wheel, and means for controlling or stopping rotation of said gear frame.

18. In reversing speed-changing transmission gearing, the combination of a rotatable driving shaft, a gear frame rotatable on the shaft and having a smooth contact-face on one side thereof extending about the shaft, a driving gear wheel opposite to said contact-face and secured to the driving shaft, a pinion rotatable in the gear frame in mesh with the driving gear wheel, a rotatable driven gear wheel in mesh with the pinion, a disk arranged between the gear frame and the driving gear wheel and having driving connection with said shaft on one side of said driving wheel, said disk being adjustable to said gear frame and having a smooth contact-face to contact with the contact-face of the frame, and means for controlling the disk.

19. In reversing speed-changing transmission gearing, the combination with a rotatable driving shaft, a driving wheel secured to the shaft, a rotatable driven wheel, a gear frame rotatable between said wheels, and a pinion rotatable in said frame in mesh with said wheels, of a main controller shaft rotatively supported, a cylindrical synchronical controller secured to the controller shaft and having a curved guide groove in one end thereof and also a spiral groove in the periphery thereof, two series of controlling devices operable to control the gear frame and having each a controlling arm, one of the arms being actuated and controlled by one of said grooves, the other one of the arms being actuated and controlled by the remaining one of the grooves, and a device connected to the main controller shaft for actuating and controlling the shaft.

20. In a transmission and controlling gearing, the combination with reversing speed-changing gearing, and two series of operable controlling means for the speed-changing gearing to effect changes and direction of speed, of synchronical primary controller movably supported and provided with two guide cams having operative connection respectively with the two series of controlling means to control the reversing of motion and change of speed, and a reciprocatory foot-pedal for moving the synchronical primary controller and provided with a foot-receiving top.

21. In reversing transmission gearing, the combination of reversing gearing having controllable elements to effect change of direction of motion, two series of connecting and controlling appliances for the controllable elements having each a rotative shaft, the shafts being arranged at right angles each with respect to the other and having each a controlling arm, and a synchronical controller device movably supported and controlled and having two operative sides arranged at right angles each to the other, one of the operative sides having controlling connection with one of said arms, the other of the operative sides of the controller device having controlling connection with the remaining one of said arms.

22. In transmission gearing, the combination of a crank shaft, a propeller shaft in alinement with the crank shaft, speed-changing gearing on said shafts for gradually connecting the propeller shaft with the crank shaft and having a series of controllable elements to effect change of speed, the series of elements including a controlling arm having a wrist pin, a single controller device for all the speed-changing gearing having an axis of rotation and a cylindrical peripheral portion provided with a guide extending spirally relatively to the axis of rotation, said guide engaging said wrist pin, and means for rotatively moving or holding the controller device.

In testimony whereof I affix my signature in presence of two witnesses.

ELLIS T. SILVIUS.

Witnesses:
J. H. GARDNER,
MYRTLE McCOY.